3,024,164
MONOETHANOLAMINE COATED DEACTIVATED SILICEOUS CARRIER FOR CHLORINATED DIMETHANONAPHTHALENE TYPE TOXICANTS
Edgar W. Sawyer, Jr., Metuchen, N.J., assignor to Minerals & Chemicals Philipp Corporation, a corporation of Maryland
No Drawing. Filed Nov. 9, 1959, Ser. No. 851,514
9 Claims. (Cl. 167—42)

The present invention relates to insecticide compositions and a method of stabilizing the same. The invention relates particularly to dry stabilized compositions in which a hexachloro-dimethanonaphthalene derivative toxicant is sorbed on a siliceous mineral carrier.

It is common practice to apply toxicants in the form of dry flowable solid compositions in which the active ingredient is mixed with or sorbed on an insoluble mineral carrier, usually a siliceous material such as certain clays. Such dry formulations take the form of dusts, wettable powders or granular compositions. In the case of dust and wettable powder formulations, very fine mineral powders, usually finer than 325 mesh, are employed whereas granular formulations employ coarser mineral particles such as, for example, 30/60 mesh particles.

Many chlorinated toxicants, especially aliphatic chlorinated toxicants are relatively stable when carried by siliceous carriers such as attapulgite clay or certain montmorillonite clays. Other chlorinated toxicants which are normally stable in their technical form and in liquid formulations are decomposed when they are carried by siliceous minerals, and after a few months of storage the insecticidal potency of such compositions is significantly diminished. Aldrin, dieldrin and endrin, which are derivatives of hexachloro-dimethanonaphthalene, exemplify chlorinated toxicants which are decomposed by clay carriers.

It has been suggested to mill clay carriers adapted for use with aldrin, dieldrin or endrin with certain solid very weak basic substances; namely, hexamethylene tetramine, or urea. The theory underlying such use of hexamethylene tetramine or urea was that catalytic decomposition was caused by the presence of acid sites on the surface of the siliceous carrier although the carrier might give a neutral or slightly alkaline pH when slurried with water. It has been found that relatively large quantities of these substances are required to provide stable dry aldrin, dieldrin and endrin compositions. At least about 4% of hexamethylene tetramine, based on the weight of the clay carrier, is recommended to stabilize compositions formulated with aldrin, dieldrin or endrin and about 5% urea is required to stabilize aldrin and dieldrin compositions. The incorporation of such large quantities of deactivators in the dry toxicant composition adds appreciably to the cost of the formulations, particularly because of the relatively high cost of the materials recommended for the purpose. It has also been suggested to employ strong caustic, such as sodium hydroxide, in dry aldrin, dieldrin or endrin formulations. While it might be expected that minute quantities of a very strong base such as NaOH would produce deactivation equivalent to that obtained with the large quantities of urea or hexamethylene tetramine, this does not occur and large quantities of NaOH, such as about 2% or more (based on the clay weight), are required to produce aldrin and dieldrin compositions of good stability. Even large quantities of NaOH do not produce the desired results in endrin formulations.

An object of the present invention is the provision of a method of treating a siliceous mineral which normally decomposes aldrin, dieldrin or endrin with an inexpensive material which in low concentration is able to prevent or reduce the decomposition of aldrin, dieldrin or endrin when sorbed on said mineral.

Another object of my invention is the provision of stable dry flowable insecticidal compositions including a particulate sorptive siliceous mineral and a hexachlorodimethanonaphthalene derivative toxicant sorbed thereon.

I have discovered a simple inexpensive method of stabilizing dry aldrin, dieldrin or endrin compositions based on a particulate siliceous mineral carrier.

Briefly stated, in accordance with the present invention I coat particles of a sorptive siliceous mineral carrier for aldrin, dieldrin or endrin with a very small quantity of monoethanolamine so as to inhibit the normal decomposition of such toxicant when sorbed on the carrier. While it might be anticipated that a relatively strong base, such as monoethanolamine, might decompose the toxicant by dehydrohalogenation, this does not take place. In the case of aldrin and dieldrin formulations as little as 0.25% monoethanolamine, based on the volatile free weight of the siliceous carrier, will produce excellent results; as little as 2% of monoethanolamine will be used in endrin formulations. Volatile free weight is the weight of a material after heating it to constant weight at 1800° F. Whereas the prior art teaches the use of relatively large quantities of deactivator compounds in dry aldrin, dieldrin and endrin formulations, the present invention affords a method of obtaining excellent deactivation using very small quantities of an inexpensive, readily available material. Whereas in the absence of deactivator over 85% by weight of aldrin, dieldrin and endrin are decomposed in certain clay based solid formulations, in compositions of my invention not more than 10% by weight of the toxicant is decomposed (decomposition being determined by a test procedure hereafter set forth).

The chlorinated hydrocarbon toxicants employed in accordance with the present invention have the following structural formula:

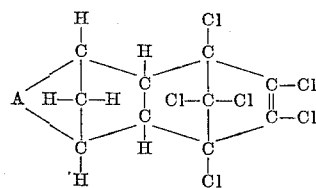

in which A is

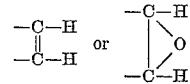

Species include aldrin (1,2,3,4,10,10-hexachloro-1,4,4a,5,8,8a-hexahydro-1,4-endo, exo-5,8-dimethanonaphthalene), dieldrin (1,2,3,4,10,10-hexachloro-6,7, epoxy-1,4,4a,5,6,7,8,8a-octahydro-1,4-endo, exo-5,8-dimethanonaphthalene) and endrin (1,2,3,4,10,10-hexachloro-6,7, epoxy-1,4,4a,5,6,7,8,8a-octahydro-1,4-endo, exo-5,8-dimethanonaphthalene). These toxicants are solids at normal temperature.

The present invention is particularly adapted to the use of attapulgite clay as the solid particulate carrier material, especially thermally activated attapulgite clay. Attapulgite clay is an outstanding carrier for many toxicants because of its high sorptivity for toxicants, low bulk density and ability to readily release sorbed toxicants. Normally dry endrin, aldrin and dieldrin compositions, based on an attapulgite clay carrier, have very poor storage stability. The invention is not limited to the use of an attapulgite clay carrier since certain highly sorptive calcium montmorillonite clays and diatomaceous earth should be benefited by treatment with the monoethanolamine.

Dry stabilized formulations within the scope of my invention include dust concentrates, wettable powders, seed dressings and granules. Dust concentrates, wettable powders and seed dressings are compositions based on finely ground carriers, frequently fine enough to pass a 325-mesh screen. They are, in general, all prepared in the same manner with the exception that 1% to 5% of surfactants and/or dispersing agents are added to the wettable powders to make them dispersible in water. Granules are prepared by impregnating the toxicant onto granular materials, usually in the size of 15 to 60 mesh. The compositions of the invention are not restricted to any particle size of mineral carrier. Both dusts and wettable powder and dust concentrates may be blended with such finely divided letting-down agents or diluents as sulfur, lime, gypsum, dolomite, talc or clays of low sorptivity such as kaolinite to make field strength preparations.

The compositions of my invention may contain toxicant in amount as great as about 75% of the volatile free weight of the mineral carrier or as little as about 0.5%. Pesticidal compositions having a very high toxicant level, such as a 75% toxicant seed dressing and 40% toxicant wettable powders are conveniently made by grinding the aldrin, dieldrin or endrin with the deactivated carrier. Substantially homogeneous compositions containing less than 25% toxicant may be conveniently prepared by mixing a solution of the toxicant in a hydrocarbon solvent with the deactivated carrier.

In putting my invention into practice, monoethanolamine is impregnated on the mineral carrier by any method which insures substantially uniform coating of the monoethanolamine on the mineral particles. This may be done, for example, by milling the monoethanolamine and mineral or by a solvent spraying technique (e.g., by spraying an aqueous solution of monoethanolamine on the carrier).

As mentioned, the quantity of monoethanolamine I employ is small and is less than 5%, based on the volatile free weight of the mineral carrier. From 0.25% to 2%, and preferably about 0.5% of monoethanolamine, based on the volatile free weight of the siliceous mineral, is employed in the deactivation of aldrin and dieldrin compositions. More than 2% of monoethanolamine may be employed in the formulation of stable aldrin and dieldrin compositions but no benefit will be obtained from the use of the larger quantities of monoethanolamine. Using less than 0.25% monoethanolamine, optimum stability is not realized. In the case of endrin compositions from about 2.0% to about 3.5%, and preferably 3% monoethanolamine, is employed. The chlorinated toxicant is then sorbed on the monoethanolamine-treated carrier.

The following examples are given to illustrate my invention.

EXAMPLE I

Experiments were conducted to illustrate the effect of incorporation of various quantities of monoethanolamine in an attapulgite clay composition containing dieldrin.

The carrier used was an activated grade of attapulgite clay supplied under the trade name of Attaclay by Minerals & Chemicals Corporation of America having the following properties:

| | Attaclay |
|---|---|
| Average particle size (microns) | 18 |
| Oil absorption (ASTM D281–31) | 99 |
| Free moisture content (as produced), wt. percent determined at 220° F. | 0.2 |
| Volatile matter (as produced), wt. percent | 7.0 |
| pH of aqueous slurry | 7.0–8.0 |
| Bulk density (lbs./cu. ft.) | 27–31 |

The chemical analysis of this clay on a volatile free weight basis is:

| | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |
| | 100.0 |

Fractions of Attaclay were impregnated with various quantities of monoethanolamine by slowly adding the monoethanolamine to a clay sample in a large Waring Blendor cup and stirring at high speed for 5 minutes. About 2% dieldrin was impregnated on each sample of monoethanolamine-treated Attaclay by milling in a hammer mill. The samples were exposed to heat as directed in Shell Method 545/53, and assays of dieldrin content of the exposed and unexposed formulations were made according to Shell Method 596/53 described in "Handbook of Aldrin, Dieldrin and Endrin SC: 54–39 (December 1954)." Shell Method 545/53 is a test method in which a sample of the material being tested for stability is placed in a stoppered test tube and immersed for 48 hours in an oil bath maintained at 195° F. (for aldrin or dieldrin). The toxicant in the heated sample is then recovered by extraction and the extract analyzed for toxicant content by infra-red spectrographic analysis. The amount of toxicant remaining after the heating period is a measure of the stability of the formulation. The toxicant content of a control sample in which no monethanolamine was incorporated was also determined. The results are summarized in Table I.

*Table I*

EFFECT OF MONOETHANOLAMINE ON THE STABILITY OF 2½ DIELDRIN DUST FORMULATED WITH ATTAPULGITE CLAY

| Percent Monoethanolamine (based on V.F. wt. of clay) | Percent Dieldrin Content (based on V.F. wt. of clay) | | | |
|---|---|---|---|---|
| | Original Sample | After Shell Method 545/53 | Percent Difference | Percent Decomposition |
| None (control) | 1.90 | 0.10 | 1.80 | 94.7 |
| 0.25 | 1.95 | 1.83 | 0.12 | 6.2 |
| 0.50 | 1.90 | 1.83 | 0.07 | 3.7 |

The results reported in Table I illustrate that extremely small quantities of monoethanolamine are highly effective in preventing the normal decomposition of dieldrin formulations based on an attapulgite clay carrier. Almost 95% of the dieldrin in the control formulation in which no monoethanolamine was employed decomposed, whereas little as 0.25% monoethanolamine stabilized the composition to the extent that only about 6% was decomposed.

EXAMPLE II

The effect of monoethanolamine on the stability of an endrin dust formulated with Attaclay was studied. Fractions of Attaclay were impregnated with various quantities of monoethanolamine and each sample was hammer milled with about 2% (based on the V.F. clay weight) of endrin. The formulations were aged in a stoppered test tube immersed for two weeks in an oil bath maintained at 130° F. in accordance with Shell Method 545/53, and the endrin content of the original sample and corresponding aged sample determined by Shell Method 575/53. The results are summarized in Table II.

Table II

EFFECT OF MONOETHANOLAMINE ON THE STABILITY OF 2% ENDRIN DUST FORMULATED WITH ATTAPULGITE CLAY

| Percent Monoethanolamine (based on V.F. wt. of clay) | Percent Endrin Content (based on V.F. wt. of clay) | | | |
|---|---|---|---|---|
| | Original Sample | After Shell Method 575/53 | Percent Difference | Percent Decomposition |
| None (control) | 1.88 | 0.25 | 1.63 | 86.7 |
| 1.0 | 1.93 | 1.17 | 0.76 | 39.3 |
| 1.5 | 1.98 | 1.54 | 0.44 | 22.3 |
| 2.0 | 2.03 | 1.83 | 0.20 | 7.0 |
| 2.5 | 1.96 | 1.82 | 0.14 | 7.1 |
| 3.0 | 2.08 | 1.93 | 0.15 | 7.2 |

The results tabulated in Table II show that 2% to 3% monoethanolamine was highly effective in curtailing the decomposition of endrin formulated with an attapulgite clay carrier. It was found that 4% hexamethylene tetramine was no more effective than 2% monoethanolamine in stabilizing the endrin formulation.

It will be understood that compositions of the invention are dry in the sense that the final products appear as dry flowable powders in contrast with liquid formulations which consist of solutions of these toxicants in organic solvents. The compositions may, however, contain absorbed moisture without deleterious effect.

This application is a continuation-in-part of my copending U.S. patent application Serial No. 700,554, filed December 4, 1957, now abandoned.

I claim:

1. A deactivated carrier for a chlorinated dimethanonaphthalene-type toxicant comprising particles of a sorptive siliceous mineral uniformly coated with from 0.25% to 2.0%, based on the volatile free weight of said siliceous mineral, of monoethanolamine.

2. A deactivated carrier for a chlorinated dimethanonaphthalene toxicant comprising particles of attapulgite clay uniformly coated with from 0.25% to 2.0%, based on the volatile free weight of said clay, of monoethanolamine.

3. A stable insecticidal composition in dry flowable form comprising particles of a sorptive siliceous material coated with from 0.25% to 2.0%, based on the volatile free weight of said siliceous material, of monoethanolamine and, sorbed thereon, a toxicant selected from the group consisting of aldrin, dieldrin and endrin.

4. A stable insecticidal composition in dry flowable form comprising particles of a sorptive siliceous mineral having dieldrin sorbed thereon and, uniformly coated on said particles from 0.25% to 2.0%, based on the volatile free weight of said mineral, of monoethanolamine.

5. A stable insecticidal composition in dry flowable form comprising particles of activated attapulgite clay having dieldrin sorbed thereon and, uniformly coated on said particles, from 0.25% to 2.0%, based on the volatile free weight of said clay, of monoethanolamine.

6. A stable insecticidal composition in dry flowable form comprising particles of a sorptive siliceous mineral having aldrin sorbed thereon and, uniformly coated on said particles, from 0.25% to 2.0%, based on the volatile free weight of said mineral, of monoethanolamine.

7. A stable insecticidal composition in dry flowable form comprising particles of activated attapulgite clay having aldrin sorbed thereon and, uniformly coated on said particles, from 0.25% to 2.0%, based on the volatile free weight of said clay, of monoethanolamine.

8. A stable insecticidal composition in dry flowable form comprising particles of a sorptive siliceous mineral having endrin sorbed thereon and, uniformly coated on said particles, from 2.0% to 3.5%, based on the volatile free weight of said mineral, of monoethanolamine.

9. A stable insecticidal composition in dry flowable form comprising particles of activated attapulgite clay having endrin sorbed thereon and, uniformly coated on said particles, from 2.0% to 3.5%, based on the volatile free weight of said clay, of monoethanolamine.

References Cited in the file of this patent

UNITED STATES PATENTS 2,043,257    Missbach _____ June 9, 1936

FOREIGN PATENTS

Shell Chemical Corp., "Handbook of Aldrin Dieldrin and Endrin Formulations," New York, N.Y., December 1954, pp. 77–81.

Weidhaas et al.: "Handbook of Insecticide Dust Diluents and Carriers," Dorland Books, Caldwell, N.J., 1955, pp. 208–212.

UNITED STATES PATENT OFFICE
CERTIFICATE OF CORRECTION

Patent No. 3,024,164            March 6, 1962

Edgar W. Sawyer, Jr.

It is hereby certified that error appears in the above numbered patent requiring correction and that the said Letters Patent should read as corrected below.

Column 4, in the title to Table I, line 2, for "2½" read -- 2% --; column 4, line 59, after "whereas" insert -- as --.

Signed and sealed this 11th day of September 1962.

(SEAL)
Attest:

ERNEST W. SWIDER
Attesting Officer

DAVID L. LADD
Commissioner of Patents